US012605949B2

(12) United States Patent
Watanabe et al.

(10) Patent No.: US 12,605,949 B2
(45) Date of Patent: Apr. 21, 2026

(54) PRINTER INCLUDING CUTTING HEAD

(71) Applicant: Roland DG Corporation, Hamamatsu (JP)

(72) Inventors: Hironori Watanabe, Hamamatsu (JP); Sho Matsunaga, Hamamatsu (JP); Tomohisa Furukawa, Hamamatsu (JP)

(73) Assignee: ROLAND DG CORPORATION, Shizuoka (JP)

( * ) Notice: Subject to any disclaimer, the term of this patent is extended or adjusted under 35 U.S.C. 154(b) by 159 days.

(21) Appl. No.: 18/769,757

(22) Filed: Jul. 11, 2024

(65) Prior Publication Data

US 2025/0018735 A1 Jan. 16, 2025

(30) Foreign Application Priority Data

Jul. 12, 2023 (JP) ................................ 2023-114558

(51) Int. Cl.

| | |
|---|---|
| ***B41J 11/70*** | (2006.01) |
| ***B26D 5/00*** | (2006.01) |
| ***B41J 11/66*** | (2006.01) |
| ***B41J 29/06*** | (2006.01) |
| ***B41J 29/13*** | (2006.01) |
| ***B65H 35/00*** | (2006.01) |
| *B41J 2/01* | (2006.01) |
| *B41J 3/44* | (2006.01) |

(52) U.S. Cl.

CPC ............... *B41J 11/706* (2013.01); *B26D 5/00* (2013.01); *B41J 11/66* (2013.01); *B41J 29/06* (2013.01); *B41J 29/13* (2013.01); *B65H 35/008* (2013.01); *B41J 2/01* (2013.01); *B41J 3/44* (2013.01)

(58) Field of Classification Search

CPC . B41J 11/706; B41J 11/66; B41J 29/06; B41J 29/13; B41J 2/01; B41J 3/44; B26D 5/00; B65H 35/008

See application file for complete search history.

(56) References Cited

U.S. PATENT DOCUMENTS

| | | | | |
|---|---|---|---|---|
| 5,296,872 A * | 3/1994 | Caamano | B41J 11/706 | 400/621 |
| 2005/0270352 A1* | 12/2005 | Iwase | B41J 11/663 | 347/104 |
| 2008/0238996 A1* | 10/2008 | Takada | B26F 1/3806 | 347/37 |

FOREIGN PATENT DOCUMENTS

| | | | |
|---|---|---|---|
| JP | 2020044624 A * | 3/2020 | B41J 11/70 |
| JP | 2022030393 A * | 2/2022 | B41J 11/66 |

* cited by examiner

*Primary Examiner* — Yaovi M Ameh
(74) *Attorney, Agent, or Firm* — Keating & Bennett, LLP

(57) ABSTRACT

In a printer including a cutting head, a coupling mechanism includes a magnet, a first support provided on one of a print carriage and a cut carriage and supporting the magnet, and an adsorption body provided on the other of the print carriage and the cut carriage and adsorbable to the magnet. The first support includes a support portion supporting the magnet, an attachment portion attachable to the one of the print carriage and the cut carriage, and a reinforcing portion connected with the support portion and the attachment portion, and is rotatable around a first axial line extending in a first perpendicular direction crossing a main scanning direction perpendicularly, with respect to the one of the print carriage and the cut carriage.

10 Claims, 11 Drawing Sheets

PRINTER INCLUDING CUTTING HEAD

CROSS REFERENCE TO RELATED APPLICATION

This application claims the benefit of priority to Japanese Patent Application No. 2023-114558 filed on Jul. 12, 2023. The entire contents of this application are hereby incorporated by reference herein.

BACKGROUND OF THE INVENTION

1. Field of the Invention

The present invention relates to printers each including a cutting head.

2. Description of the Related Art

A cutting head-including printer including both of a print head to perform printing on a recording medium and a cutting head to cut the recording medium has been conventionally known. For example, Japanese Laid-Open Patent Publication No. 2022-030393 discloses a cutting head-including printer including a print head (ink head), a cutting head, a coupling device coupling the print head and the cutting head to each other, a guide rail with which the print head and the cutting head are slidably engaged, and a mover to move the cutting head along the guide rail. The coupling device disclosed Laid-Open Patent Publication No. 2022-030393 includes a magnet provided on the print head and a sheet metal provided on the cutting head and adsorbable to the magnet. The print head is coupled with the cutting head and thus is movable by the mover.

The coupling device disclosed in Japanese Laid-Open Patent Publication No. 2022-030393 further includes a rubber member inserted between the sheet metal and a surface of the magnet opposite to an adsorbing surface thereof. Japanese Laid-Open Patent Publication No. 2022-030393 discloses that, when the magnet and the sheet metal are coupled to each other, the rubber member is deformed such that the adsorbing surface of the magnet and an adsorbing surface of the sheet metal are parallel to each other. Therefore, a contact area of the magnet and the sheet metal is increased, and as a result, the force by which the print head and the cutting head are coupled with each other is strengthened.

At the time of coupling the ink head and the cutting head to each other or at the time of separating the ink head and the cutting head from each other, a member holding the magnet is subjected to a relatively large impact load. Therefore, the member holding the magnet may be curved if having a low rigidity. In the case where this occurs to the configuration described in Japanese Laid-Open Patent Publication No. 2022-030393, the adsorbing surface of the magnet and the adsorbing surface of the sheet metal cannot be parallel to each other even though the rubber member is deformed. This may weaken the force of adsorption, and the coupling force between the magnet and the sheet metal may not be stable.

SUMMARY OF THE INVENTION

Example embodiments of the present invention provide printers each including a coupling mechanism to couple a print carriage including a print head mounted thereon and a cut carriage including a cutting head mounted thereon to each other, and each achieving a more stable coupling force.

A printer according to an example embodiment of the present disclosure includes a print head to eject ink, a print carriage to hold the print head, a cutting head including a cutter to cut a recording medium, a cut carriage to hold the cutting head, a guide rail extending in a main scanning direction, the print carriage and the cut carriage being engaged with the guide rail so as to be slidable in the main scanning direction, a mover to move the print carriage or the cut carriage along the guide rail, and a coupling mechanism provided on the print carriage and the cut carriage to couple the print carriage and the cut carriage to each other. The coupling mechanism includes a magnet, a first support provided on one of the print carriage and the cut carriage to support the magnet, and an adsorption body provided on the other of the print carriage and the cut carriage to be adsorbable to the magnet. The first support includes a support portion to support the magnet, an attachment portion attachable to the one of the print carriage and the cut carriage, and a reinforcing portion connected with the support portion and the attachment portion, and the first support is rotatable with respect to the one of the print carriage and the cut carriage, the first support being rotatable around a first axial line extending in a first perpendicular direction crossing the main scanning direction perpendicularly.

With the above-described printer, the first support supporting the magnet is rotatable around the first axial line perpendicular to the main scanning direction, so that the orientation of the magnet is matched to the orientation of the adsorption body. The first support includes the reinforcing portion connected with the support portion supporting the magnet and the attachment portion attached to the print carriage or the cut carriage. The reinforcing portion connects the support portion and the attachment portion to each other to improve the rigidity of the support portion. Therefore, the support portion is not easily curved, and the orientation of the magnet is maintained even at the time of coupling the print carriage and the cut carriage to each other or at the time of separating the print carriage and the cut carriage from each other. This stabilizes the coupling of the print carriage and the cut carriage by the coupling mechanism.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Example Embodiment 1

Figure 1:
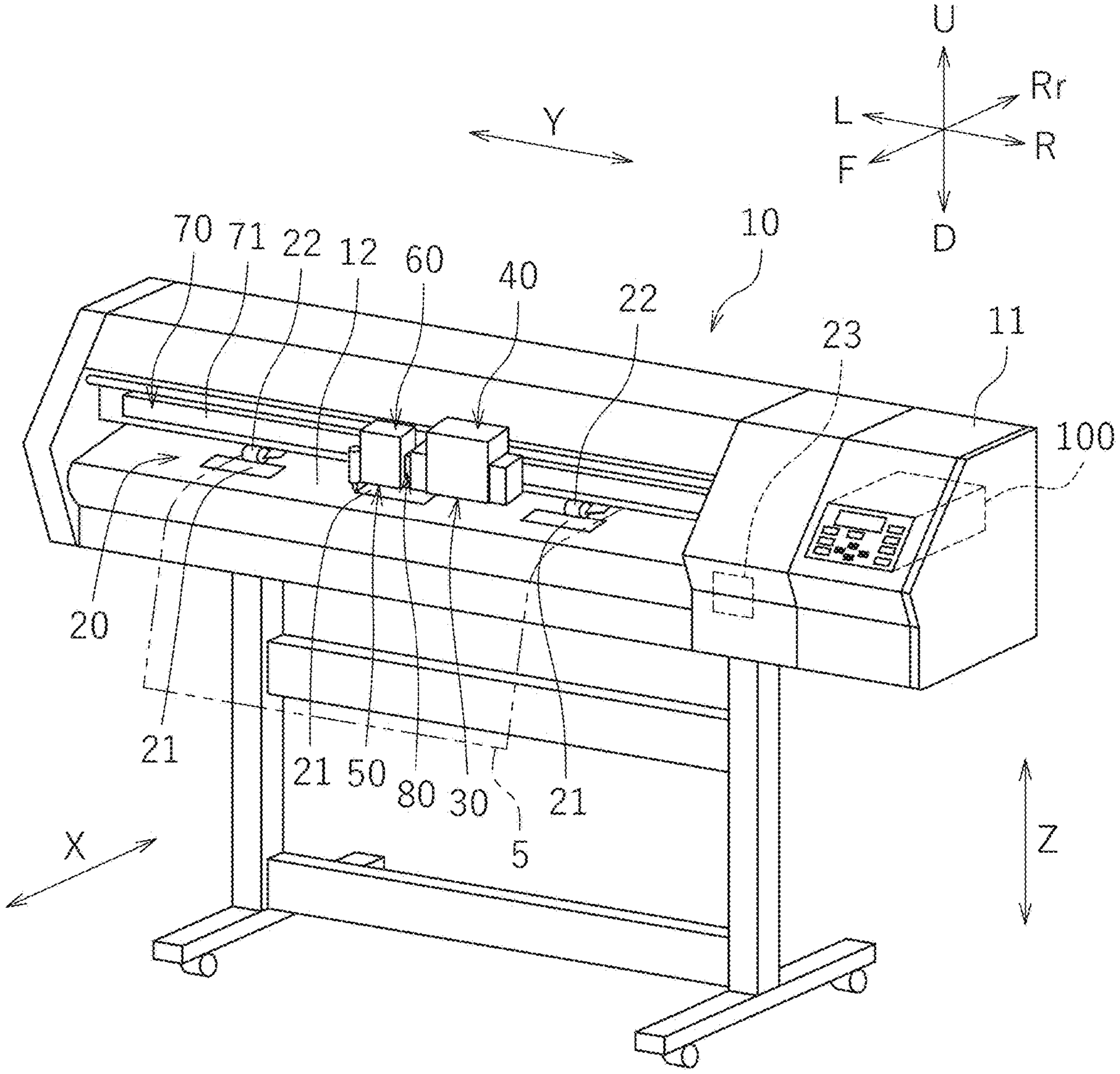
FIG. 1 is a perspective view of a printer according to example embodiment 1 of the present invention.

Hereinafter, example embodiments of the present invention will be described with reference to the drawings. FIG. 1 is a perspective view of a printer 10 including a cutting head (hereinafter, referred to as "the printer 10") according to this example embodiment. As shown in FIG. 1, the printer 10 according to this example embodiment performs printing and cutting on a sheet-like recording medium 5. The recording medium 5 may be, for example, a seal member including a base sheet and a release paper sheet stacked on the base sheet and having an adhesive applied thereto, a recording paper sheet, a resin sheet or the like. It is sufficient that the recording medium 5 allows either one of printing or cutting to be performed thereon, and there is no other specific limitation on the recording medium 5.

In this specification, the term "cutting" encompasses a case where the recording medium 5 is cut in the entirety of a thickness direction thereof (e.g., a case where both of the base sheet and the release paper sheet of the seal member are cut) and a case where the recording medium 5 is cut in a portion of the thickness direction thereof (e.g., a case where only the release paper sheet of the seal member is cut without the base sheet being cut).

The printer 10 includes a main body 11, a platen 12 provided in the main body 11 and supporting the recording medium 5, a transportation device 20 to transport the recording medium 5 supported by the platen 12, a print head 30 to eject ink toward the recording medium 5, a print carriage 40 to hold the print head 30, a cutting head 50 to cut the recording medium 5, a cut carriage 60 to hold the cutting head 50, a carriage mover 70 to move the print carriage 40 and the cut carriage 60, a coupling mechanism 80 to couple the print carriage 40 and the cut carriage 60 to each other, and a separation device 90 (see FIG. 2) to release the print carriage 40 and the cut carriage 60 from the coupled state and thus separate the print carriage 40 and the cut carriage 60 from each other.

As described below in detail, a moving direction of the print carriage 40 and the cut carriage 60 moved by the carriage mover 70 is a Y direction shown in the drawings. The recording medium 5 is transported by the transportation device 20 in an X direction shown in the drawings. Hereinafter, the Y direction will be referred to also as a "main scanning direction", and the X direction will be referred to also as a "sub scanning direction". In this example embodiment, the main scanning direction Y is a left-right direction. In this example embodiment, the sub scanning direction X is a front-rear direction. The main scanning direction Y, the sub scanning direction X and an up-down direction Z cross each other perpendicularly. The up-down direction Z is an example of the first perpendicular direction crossing the main scanning direction Y perpendicularly. The sub scanning direction X is an example of the second perpendicular direction crossing the main scanning direction Y perpendicularly. In the drawings, reference signs F, Rr, L, R, U and D respectively represent front, rear, left, right, up and down.

As shown in FIG. 1, the transportation device 20 includes grit rollers 21, pinch rollers 22, and a feed motor 23. The grit rollers 21 are provided on the platen 12. The grit rollers 21 rotate by being driven by the feed motor 23. The pinch rollers 22 are located above the grit rollers 21. The pinch rollers 22 are located so as to face the grit rollers 21. The pinch rollers 22 are swingable up and down so as to be closer to, and away from, the grip rollers 21. When the grit rollers 21 rotate in a state where the recording medium 5 is held between the pinch rollers 22 and the grit rollers 21, the recording medium 5 is transported forward or rearward. In FIG. 1, only three grit rollers 21 and only two pinch rollers 22 are shown. In actuality, a larger number of grit rollers 21 and a larger number of pinch rollers 22 may be aligned in the main scanning direction Y.

Figure 2:
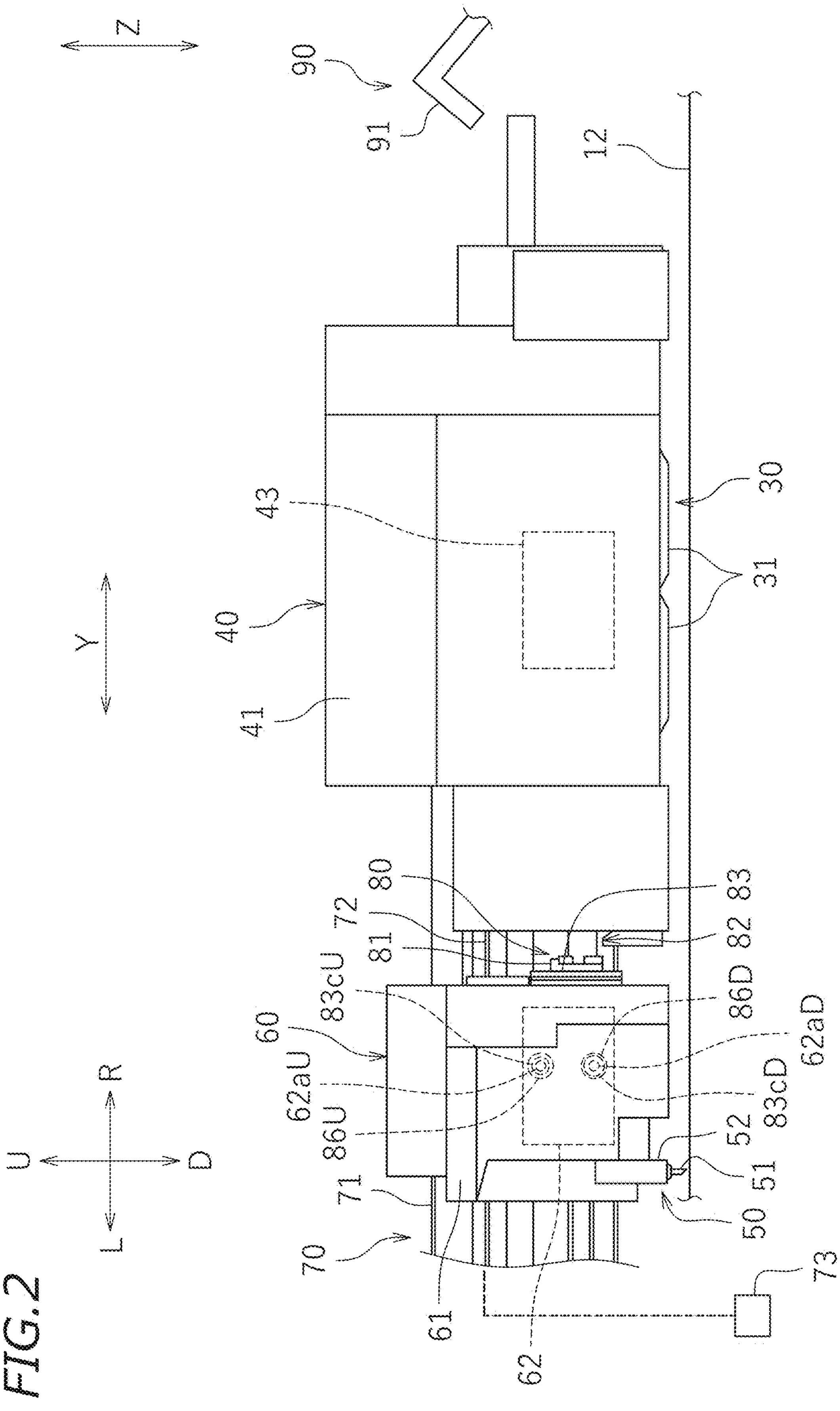
FIG. 2 is a front view of a print carriage and a cut carriage.

FIG. 2 is a front view of the print carriage 40 and the cut carriage 60. FIG. 2 shows a state where the print carriage 40 and the cut carriage 60 are coupled to each other. In a state where the print carriage 40 and the cut carriage 60 are coupled to each other, the carriage mover 70 moves the print carriage 40 and the cut carriage 60 integrally. In a state where the print carriage 40 and the cut carriage 60 are separate from each other, the carriage mover 70 moves only the cut carriage 60.

As shown in FIG. 2, the carriage mover 70 includes a guide rail 71, a belt 72, and a scan motor 73. The guide rail 71 is provided above the platen 12. The guide rail 71 extends in the main scanning direction Y. The print carriage 40 and the cut carriage 60 are engaged with the guide rail 71 so as to be slidable in the main scanning direction Y. In this example embodiment, the cutting head 50 is located to the left of the print head 30. The belt 72 extending in the main scanning direction Y is secured to a top rear portion of the cut carriage 60. The belt 72 is connected with the scan motor 73. A combination of the scan motor 73 and the belt 72 is an example of the mover to move the cut carriage 60 along the guide rail 71. When the scan motor 73 rotates, the belt 72 moves in the main scanning direction Y. As a result, the cut carriage 60 moves in the main scanning direction Y. Alternatively, the carriage mover 70 may move the print head 30 in the main scanning direction Y along the guide rail 71. In this case, in a state where the print carriage 40 and the cut carriage 60 are separate from each other, the carriage mover 70 moves only the print carriage 40.

The print head 30 is mounted on the print carriage 40 and is located above the platen 12. The print head 30 ejects ink toward the recording medium 5 supported by the platen 12. The print head 30 includes a plurality of ink heads 31. At each of bottom surfaces of the plurality of ink heads 31, a plurality of nozzles (not shown) to eject ink are provided. In this example embodiment, the ink heads 31 are inkjet-type heads. There is no specific limitation on the number of the ink heads 31, or there is no specific limitation on the type or the color of the ink to be ejected by each of the ink heads 31. There is no specific limitation on the method by which the ink heads 31 eject ink.

The cutting head 50 is mounted on the cut carriage 60 and is located above the platen 12. The cutting head 50 includes a cutter 51 to cut the recording medium 5, and a cutter holding device 52. The cutter holding device 52 moves the cutter 51 in the up-down direction Z to put the cutter 51 into contact with, or to separate the cutter 51 away from, the recording medium 5 on the platen 12. The cutter holding device 52 includes a solenoid (not shown) to move the cutter 51 in the up-down direction Z. When the solenoid is turned on or off, the cutter 51 moves in the up-down direction Z to contact the recording medium 5 or to be separated away from the recording medium 5.

The coupling mechanism 80 is provided on the print carriage 40 and the cut carriage 60, and couples the print carriage 40 and the cut carriage 60 to each other. When the print head 30 is to perform the printing, the print carriage 40 and the cut carriage 60 are coupled to each other. As a result, the print carriage 40 becomes movable in the main scanning direction Y together with the cut carriage 60. A configuration of the coupling mechanism 80, and configurations of the print carriage 40 and the cut carriage 60 related to the coupling mechanism 80, will be described below.

The separation device 90 locks the print carriage 40 such that the print carriage 40 is not movable in the main scanning direction Y, and thus separates the print carriage 40 and the cut carriage 60 from each other. As shown in FIG. 2, the separation device 90 includes a hook 91 to be hung on the print carriage 40. The hook 91 is provided at a right end of a range in which the print carriage 40 and the cut carriage 60 are movable. When the cutting head 50 is to perform the cutting, the print carriage 40 is positioned at a wait position at the right end of the movable range. In this state, the hook 91 is hung on the print carriage 40 by an actuator (not shown). As a result, the print carriage 40 is prevented from moving. When the cut carriage 60 moves leftward in this state, the cut carriage 60 and the print carriage 40 are separated from each other. In this manner, only the cut carriage 60 is movable in the main scanning direction Y, whereas the print carriage 40 waits at the wait position.

As shown in FIG. 1, the printer 10 includes a controller 100. The controller 100 is configured or programmed to control operations of the feed motor 23 of the transportation device 20, the scan motor 73 of the carriage mover 70, the ink heads 31 of the print head 30, the solenoid (not shown) of the cutting head 50, and the actuator (not shown) of the separation device 90. There is no specific limitation on the configuration of the controller 100. The controller 100 may include, for example, a central processing unit (CPU) to execute commands of a control program, a ROM (read only memory) to store the program to be executed by the CPU, a RAM (random access memory) usable as a working area where the program is to be developed, and a storage device, such as a memory or the like, to store the above-described program and various types of data.

Figure 3:
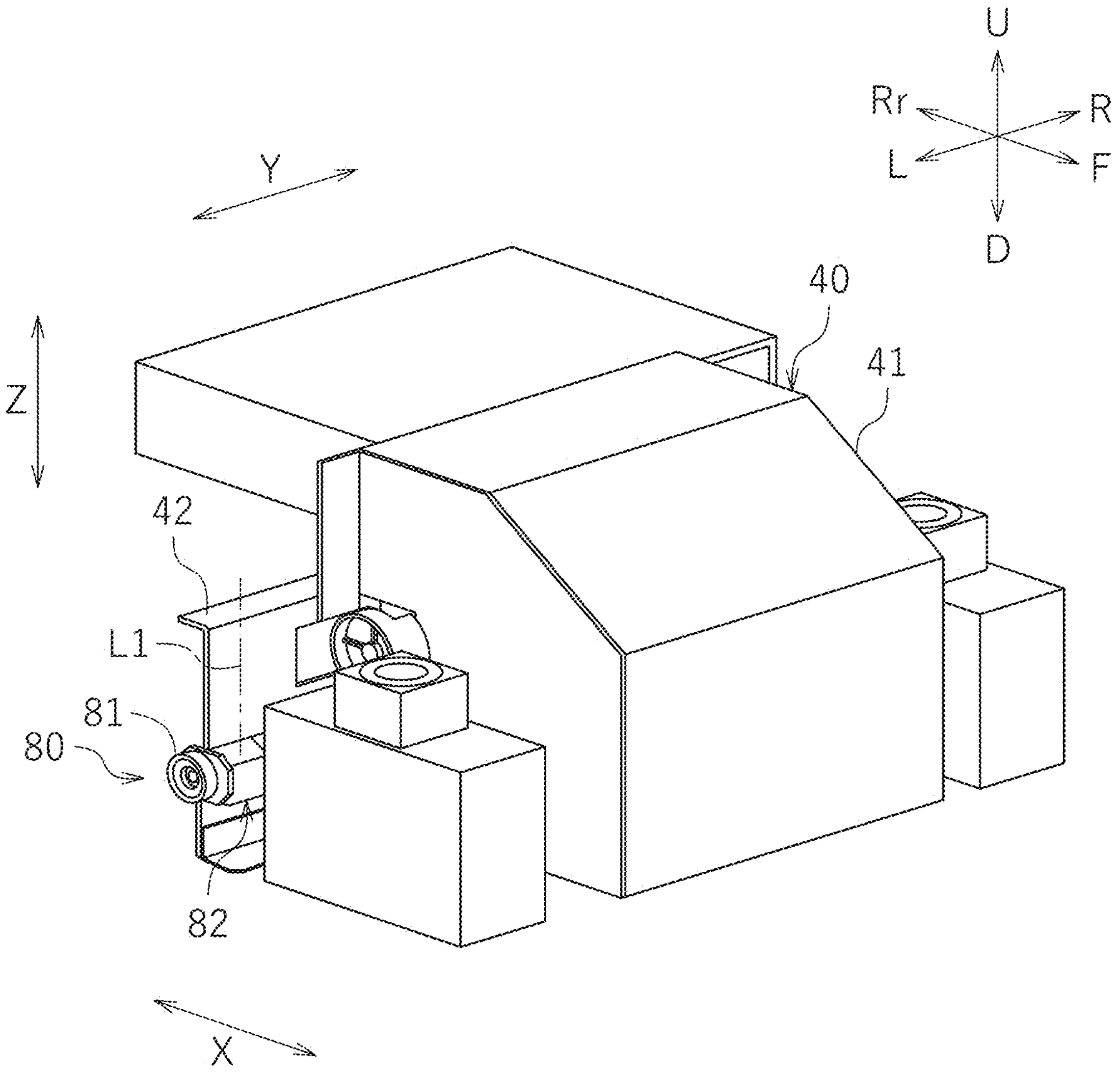
FIG. 3 is a perspective view of the print carriage.
Figure 4:
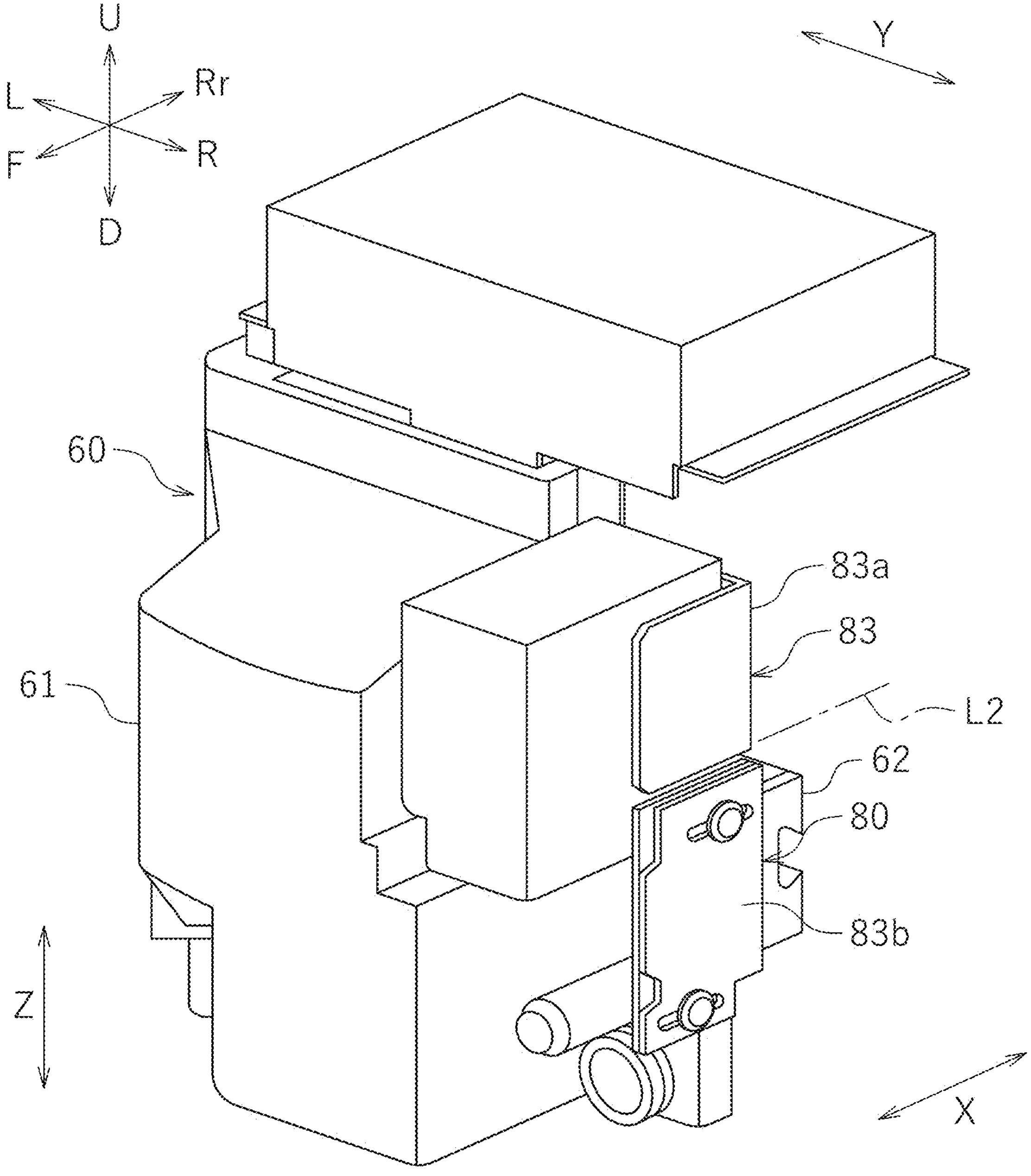
FIG. 4 is a perspective view of the cut carriage.

Hereinafter, the configuration of the coupling mechanism 80, and the configurations of the print carriage 40 and the cut carriage 60 related to the coupling mechanism 80, will be described. FIG. 3 is a perspective view of the print carriage 40. The perspective view of the print carriage 40 shown in FIG. 3 is drawn such that a left side surface of the print carriage 40, that is, a side surface of the print carriage 40 closer to the cut carriage 60, is shown. FIG. 4 is a perspective view of the cut carriage 60. The perspective view of the cut carriage 60 shown in FIG. 4 is drawn such that a right side surface of the cut carriage 60, that is, a side surface of the cut carriage 60 closer to the print carriage 40, is shown. As shown in FIG. 3 and FIG. 4, the coupling mechanism 80 includes a magnet 81, a magnet holder 82 supporting the magnet 81, and an adsorption plate 83 provided so as to partially face the magnet 81 (also see FIG. 2). The magnet 81 and the magnet holder 82 are provided on the print carriage 40. The adsorption plate 83 is provided on the cut carriage 60. The adsorption plate 83 includes a magnetic material so as to adsorb to the magnet 81. The adsorption plate 83 is an example of the adsorption body that is adsorbable to the magnet 81.

As shown in FIG. 3, the print carriage 40 includes a case 41 to accommodate the print head 30 (see FIG. 2), a base plate 42 to support the case 41, and a linear guide 43 (see FIG. 2) secured to the base plate 42 and slidably engaged with the guide rail 71.

Figure 5:
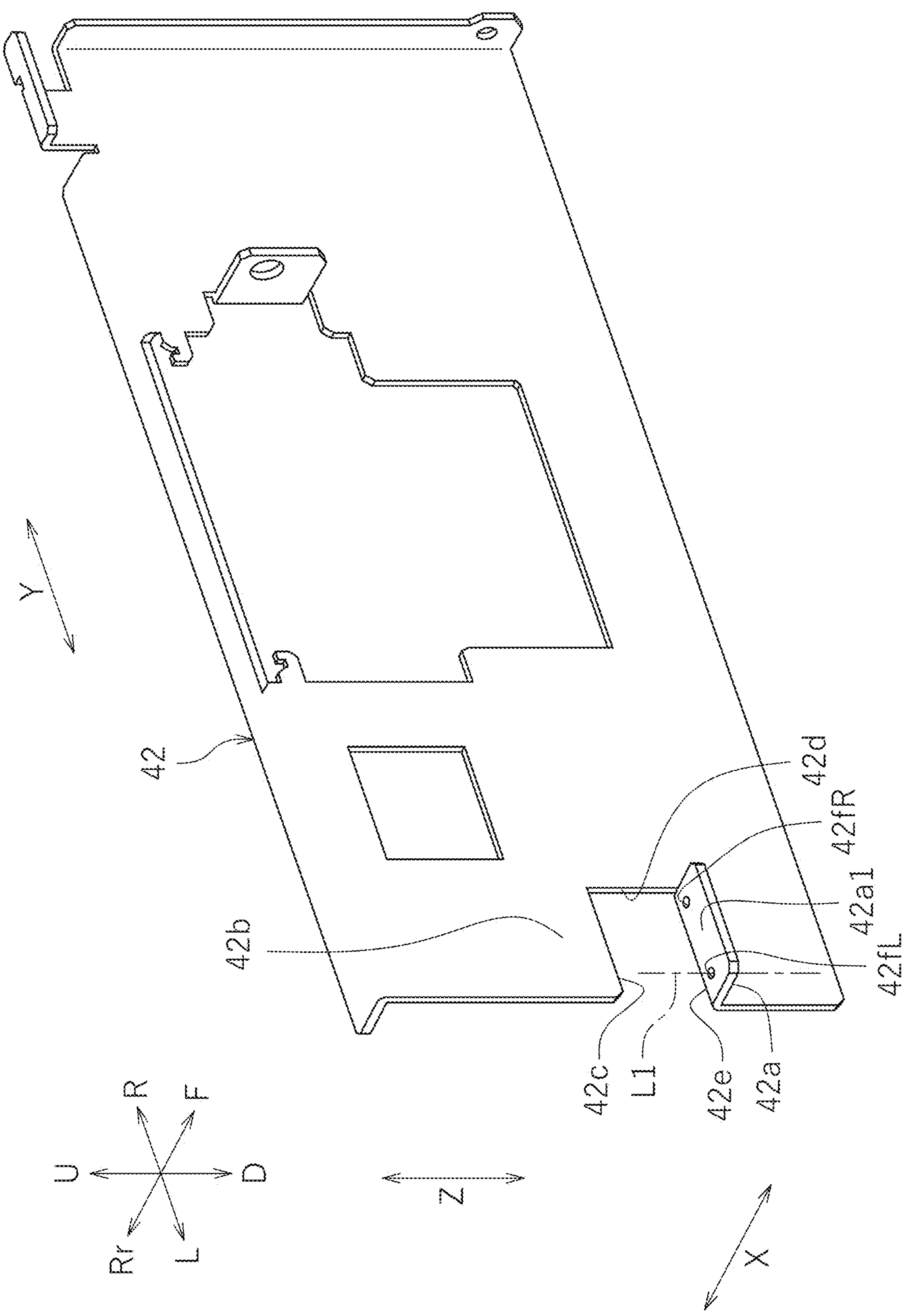
FIG. 5 is a perspective view of a base plate of the print carriage.

FIG. 5 is a perspective view of the base plate 42 of the print carriage 40. As shown in FIG. 5, the base plate 42 is a plate-shaped structure. The base plate 42 extends in the main scanning direction Y and the up-down direction Z. The base plate 42 includes a mount portion **42*a*, to which the magnet holder 82 is attachable. The mount portion 42*a* is provided at a left end of the base plate 42. As shown in FIG. 5, the mount portion 42*a* is formed by cutting a portion of a wall 42*b* of the base plate 42 extending in the main scanning direction Y and the up-down direction Z and bending the cut portion such that the cut portion is directed in the up-down direction Z. More specifically, in the wall 42*b* of the base plate 42, a horizontally cut line 42*c* and a vertically cut line 42*d* are included. The horizontally cut line 42*c* extends in the main scanning direction Y and cut up to the left end of the wall 42*b*. The vertically cut line 42*d* extends downward from a right end of the horizontally cut line 42*c*. A portion of the wall 42*b* is bent forward along a bending line 42*e* extending in the main scanning direction Y from a bottom end of the vertically cut line 42*d*. This portion bent forward defines the mount portion 42*a* directed upward. A top surface of the mount portion 42*a* defines an attachment surface 42*a*1, to which the magnet holder 82** is attachable.

The mount portion **42*a* includes screw holes 42*f*L and 42*f*R formed therein. Screws 84L and 84R (described below; see FIG. 8) to secure the magnet holder 82 are screwed with the screw holes 42*f*L and 42*f*R. The screw holes 42*f*L and 42*f*R are aligned in the main scanning direction Y. The direction in which the screw holes 42*f*L and 42*f*R are aligned is not limited to the main scanning direction Y. The screw holes 42*f*L and 42*f*R extend in the up-down direction Z. The left screw hole 42*f*L is an example of the first screw hole. The right screw hole 42*f*R is an example of the second screw hole. The mount portion 42*a* is an example of an attachment wall in which the first screw hole and the second screw hole are located. In this example embodiment, the screw holes 42*f*L and 42*f*R both extend through the mount portion 42*a*. The screw holes 42*f*L and 42*f*R do not need to be through-holes running through the mount portion 42*a***.

Figure 6:
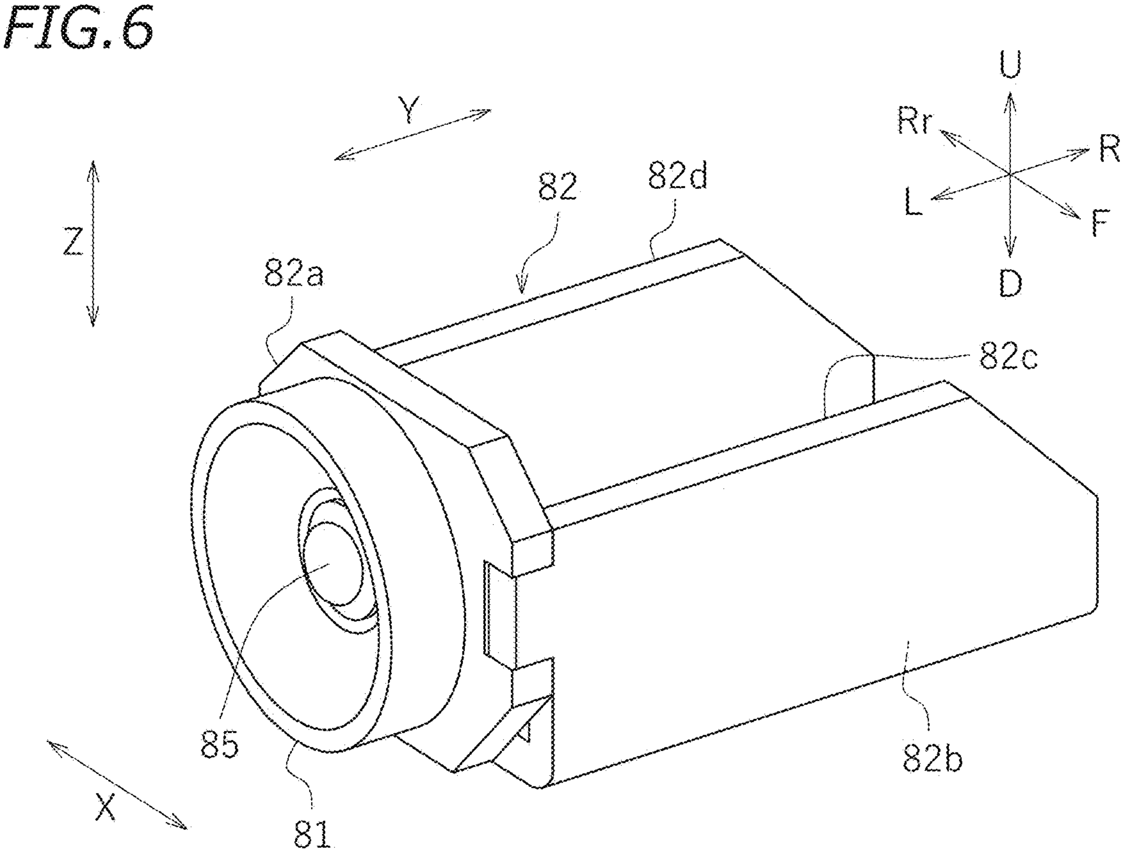
FIG. 6 is a perspective view of a magnet holder.
Figure 7:
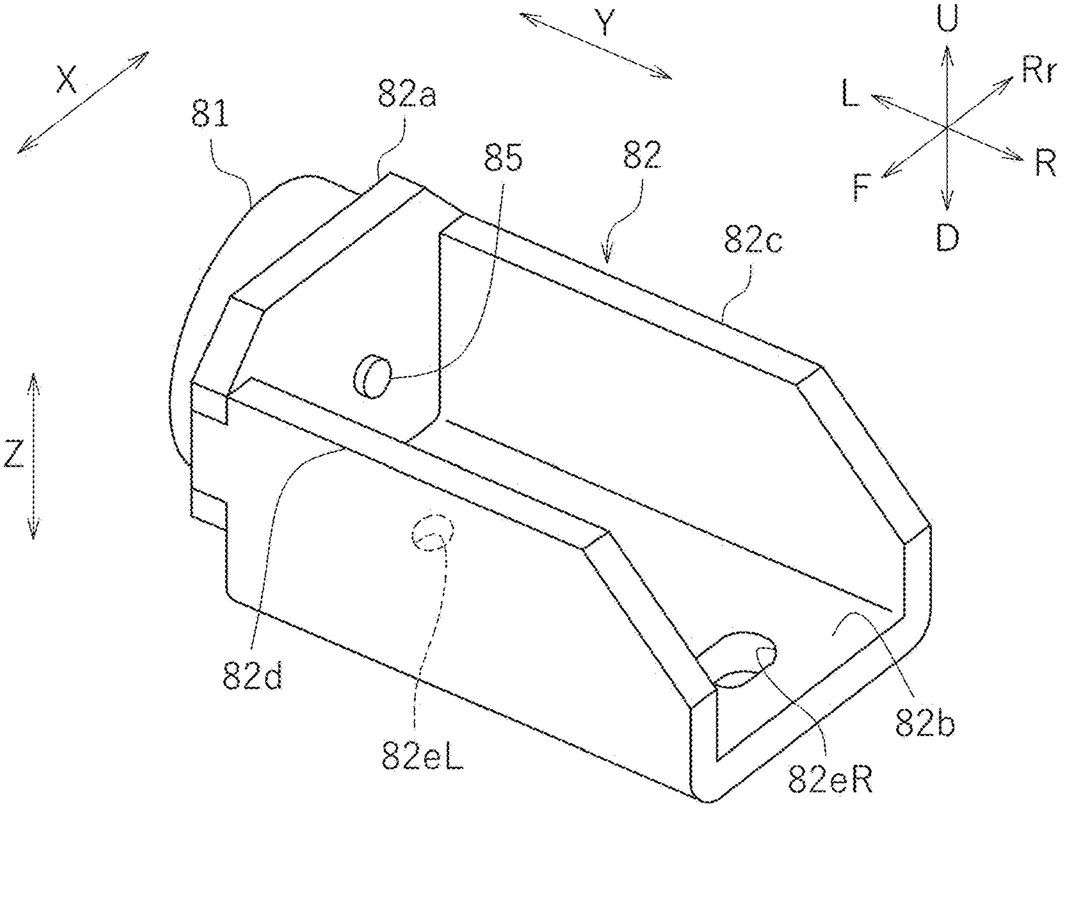
FIG. 7 is a perspective view of the magnet holder.
Figure 8:
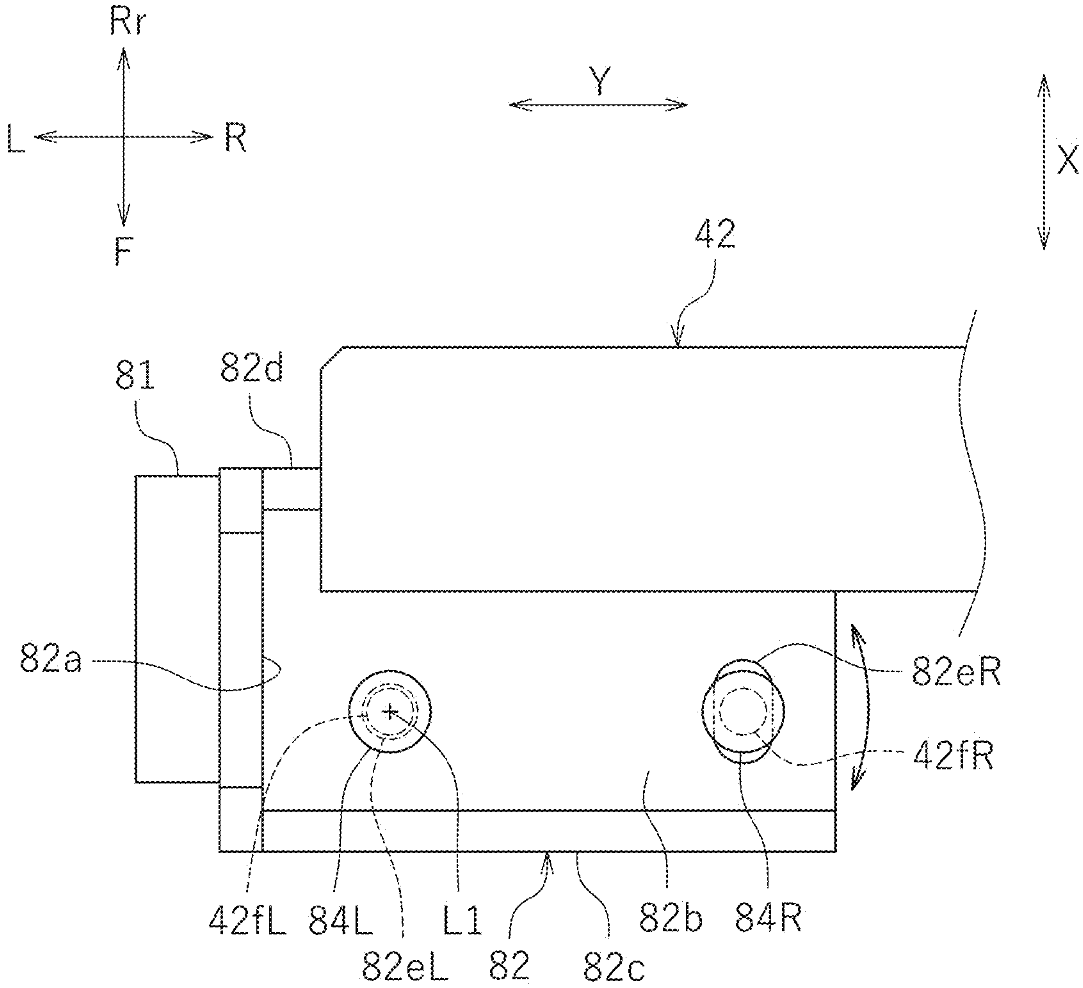
FIG. 8 is a plan view of the base plate in a state where the magnet holder is attached thereto.

FIG. 6 and FIG. 7 are each a perspective view of the magnet holder 82. FIG. 8 is a plan view of the base plate 42 in a state where the magnet holder 82 is attached thereto. As shown in FIG. 6 and FIG. 7, the magnet holder 82 includes a support wall **82*a* to support the magnet 81, a bottom wall 82*b* connected with the support wall 82*a*, a first reinforcing wall 82*c* connected with the support wall 82*a* and the bottom wall 82*b*, and a second reinforcing wall 82*d* also connected with the support wall 82*a* and the bottom wall 82*b*. The first reinforcing wall 82*c* and the second reinforcing wall 82*d* are both connected with the support wall 82*a* and the bottom wall 82*b*, and define a reinforcing portion improving the rigidity of the support wall 82*a***.

The support wall **82*a* extends in the up-down direction Z and the sub scanning direction X. In this example embodiment, the support wall 82*a* is a left side wall of the magnet holder 82, that is a side wall of the magnet holder 82 closer to the cut carriage 60. In this example embodiment, the magnet 81 has a hollow cylindrical shape having a bottom. There is no specific limitation on the shape of the magnet 81. It is sufficient that the magnet 81 includes a plane directed toward the cut carriage 60 (leftward in this example embodiment). The bottom of the magnet 81 is secured to the support wall 82*a* by a screw 85 tightened to the support wall 82*a*. There is no specific limitation on the configuration by which the support wall 82*a* supports the magnet 81**.

The bottom wall **82*b* is connected with a bottom edge of the support wall 82*a*. The bottom wall 82*b* extends in the main scanning direction Y and the sub scanning direction X. The bottom wall 82***b* is secured to the print carriage 40 (more specifically, the mount portion 42*a* of the base plate 42) by the screws 84L and 84R. The bottom wall 82*b* becomes rotatable forward and rearward with respect to the print carriage 40 (mount portion 42*a*) when the screws 84L and 84R are loosened. The bottom wall 82*b* is an example of the attachment portion attachable to the print carriage 40.

As shown in FIG. 7, the bottom wall 82*b* includes a left through-hole 82*e*L and a right though-hole 82*e*R formed therein. The left through-hole 82*e*L and the right though-hole 82*e*R extend through the bottom wall 82*b* in the up-down direction Z. The left through-hole 82*e*L and the right though-hole 82*e*R are aligned in the main scanning direction Y. The left screw hole 42*f*L and the right screw hole 42*f*R in the mount portion 42*a* are respectively located so as to face the left through-hole 82*e*L and the right though-hole 82*e*R (see FIG. 8). The left screw 84L is inserted into the left through-hole 82*e*L and screwed with the left screw hole 42*f*L. The right screw 84R is inserted into the right through-hole 82*e*R and screwed with the right screw hole 42*f*R. The left screw 84L and the right screw 84R define an example of the first securing structure to secure the magnet holder 82 to the print carriage 40.

The left through-hole 82*e*L has a diameter corresponding to a diameter of the left screw 84L. The left through-hole 82*e*L is configured such that the left screw 84L does not wobble almost at all. The left screw 84L is inserted into the left through-hole 82*e*L and screwed with the left screw hole 42*f*L, and as a result, the position of the left through-hole 82*e*L is determined to be a position above the left screw hole 42*f*L.

The right through-hole 82*e*R has a dimension longer than a diameter of the right screw 84R such that the magnet holder 82 is rotatable around the left through-hole 82*e*L and the left screw hole 42*f*L as the center of rotation. In this example embodiment, the right through-hole 82*e*R has an elliptical shape longer in the sub scanning direction X. It is sufficient that the right through-hole 82*e*R is configured such that the magnet holder 82 is rotatable by a necessary distance around the left through-hole 82*e*L and the left screw hole 42*f*L as the center of rotation. The right through-hole 82*e*R may be, for example, circular, rectangular or the like. As shown in FIG. 3 and FIG. 8, an axial line running through the left though-hole 82*e*L and the left screw hole 42*f*L and extending in the up-down direction Z will be referred to also as a "first axial line L1", hereinafter. The first axial line L1 is an axis of rotation of the magnet holder 82. The magnet holder 82 becomes rotatable around the first axial line L1 when the screws 84L and 84R are loosened. When the screws 84L and 84R are tightened, the magnet holder 82 becomes non-rotatable around the first axial line L1 and is secured.

As shown in FIG. 6, the first reinforcing wall 82*c* is connected with one edge of the support wall 82*a* in the sub-scanning direction X, more specifically, with a front edge in this example embodiment. The first reinforcing wall 82*c* is also connected with a front edge of the bottom wall 82*b*. The first reinforcing wall 82*c* extends in the main scanning direction Y and the up-down direction Z. Herein, the expression "extend in the main scanning direction Y" used for the first reinforcing wall 82*c* and the like encompasses a case where the first reinforcing wall 82*c* or the like extends in a direction slightly shifted from the main scanning direction Y as a result of the magnet holder 82 being rotated in a rotatable range thereof. This is also applicable to the direction in which the adsorption plate 83 extends, described below. Even in the case where the direction in which the adsorption plate 83 extends is slightly changed as a result of an adjustment, the adsorption plate 83 is expressed as, for example, "extending in the up-down direction Z". The first reinforcing wall 82*c* connects the support wall 82*a* and the bottom wall 82*b* to each other to improve the rigidity of the support wall 82*a*.

The second reinforcing wall 82*d* is connected with the other edge of the support wall 82*a* in the sub-scanning direction X, more specifically, with a rear edge in this example embodiment. The second reinforcing wall 82*d* is also connected with a rear edge of the bottom wall 82*b*. The second reinforcing wall 82*d* extends in the main scanning direction Y and the up-down direction Z. The second reinforcing wall 82*d* extends substantially parallel to the first reinforcing wall 82*c*. The second reinforcing wall 82*d* faces the first reinforcing wall 82*c* across the bottom wall 82*b*. The second reinforcing wall 82*e* also connects the support wall 82*a* and the bottom wall 82*b* to each other to improve the rigidity of the support wall 82*a*. These walls 82*a* through 82*d* allow the magnet holder 82 to have a shape of a bottomed box having no lid and having an opening facing the support wall 82*a*.

As shown in FIG. 3, the magnet holder 82 locates the magnet 81 on a side surface of the print carriage 40 in the main scanning direction Y. In this example embodiment, the magnet 81 is located on the left side surface of the print carriage 40 (side surface closer to the cut carriage 60) by the magnet holder 82. As a result, the magnet 81 is directed toward the cut carriage 60.

As shown in FIG. 4, the cut carriage 60 includes an accommodation case 61 to accommodate the cutting head 50 (see FIG. 2), and a linear guide 62 slidably engaged with the guide rail 71. In this example embodiment, the adsorption plate 83 supports the case 61 and is secured to the linear guide 62. The adsorption plate 83 also acts as a base plate of the cut carriage 60. As shown in FIG. 4, the adsorption plate 83 includes a base plate portion 83*a* extending in the main scanning direction Y and the up-down direction Z and acting as the base plate, and an adsorption portion 83*b* extending in the sub scanning direction X and the up-down direction Z and adsorbable to the magnet 81. A portion of the adsorption plate 83, more specifically, the adsorption portion 83*b* in this example embodiment, is provided on the cut carriage 60 so as to face the magnet 81, and adsorbs to the magnet 81. The base plate portion 83*a* and the adsorption portion 83*b* are formed by bending the adsorption plate 83. The adsorption plate 83 is defined by a flat plate of a magnetic metal material, for example, an iron plate.

Figure 9:
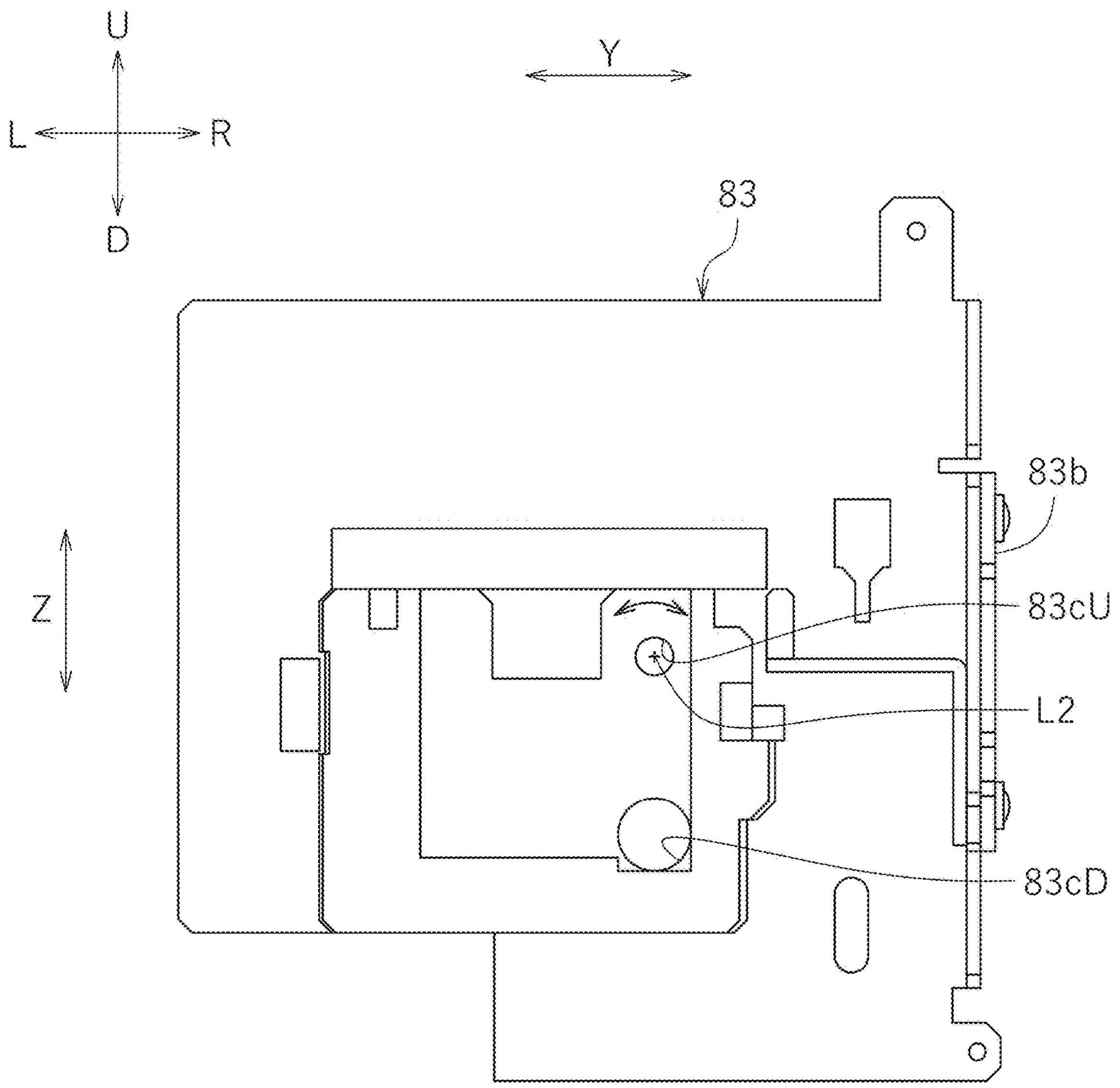
FIG. 9 is a front view of an adsorption plate of the cut carriage.

FIG. 9 is a front view of the adsorption plate 83 (base plate) of the cut carriage 60. As shown in FIG. 9, the adsorption plate 83 includes a top through-hole 83*c*U and a bottom through-hole 83*c*D formed therein. The top through-hole 83*c*U and the bottom through-hole 83*c*D extend through the adsorption plate 83 in the sub scanning direction X. The top through-hole 83*c*U and the bottom through-hole 83*c*D are aligned in the up-down direction Z. As shown in FIG. 2, the linear guide 62 includes a top screw hole 62*a*U and a bottom screw hole 62*a*D formed therein. The top screw hole 62*a*U and the bottom screw hole 62*a*D are located at positions corresponding to the positions of the top through-hole 83*c*U and the bottom through-hole 83*c*D respectively. A top screw 86U is inserted into the top through-hole 83*c*U of the adsorption plate 83. The top screw 86U is screwed with the top screw hole 62*a*U of the linear guide 62. A bottom screw 86D is inserted into the bottom through-hole 83*c*D of the adsorption plate 83. The bottom screw 86D is screwed with the bottom screw hole 62*a*D of the linear guide 62. The top screw 86U and the bottom screw 86D define an example of the second securing structure to secure the adsorption plate 83 to the cut carriage 60.

The top through-hole 83*c*U has a diameter corresponding to a diameter of the top screw 86U. The top through-hole 83*c*U is configured such that the top screw 86U does not wobble almost at all. The top screw 86U is inserted into the top through-hole 83*c*U and screwed with the top screw hole 62*a*U, and as a result, the position of the top through-hole 83*c*U is determined to be a position overlapping the top screw hole 62*a*U (at a position forward to the top screw hole 62*a*U in this example embodiment).

The bottom through-hole 83*c*D has a dimension longer than a diameter of the bottom screw 86D such that the adsorption plate 83 is rotatable around the top through-hole 83*c*U and the top screw hole 62*a*U as the center of rotation. In this example embodiment, the bottom through-hole 83*c*D has a circular shape having a diameter longer than that of the bottom screw 86D. The bottom through-hole 83*c*D is not limited to having any specific shape. As shown in FIG. 4 and FIG. 9, an axial line running through the top though-hole 83*c*U and the top screw hole 62*a*U and extending in the sub scanning direction X will be referred to also as a "second axial line L2", hereinafter. The second axial line L2 is an axis of rotation of the adsorption plate 83. The adsorption plate 83 becomes rotatable around the second axial line L2 when the screws 86U and 86D are loosened. When the screws 86U and 86D are tightened, the adsorption plate 83 becomes non-rotatable around the second axial line L2 and is secured.

In a process of producing the printer 10, the orientation of the magnet 1 around the first axis L1 and the orientation of the adsorption plate 83 around the second axis L2 are adjusted to cause the magnet 81 and the adsorption plate 83 to face each other at a high precision. Such an adjustment allows a certain area of a contact plane of the magnet 81 and the adsorption plate 83 to be provided as designed, and as a result, the magnet 81 and the adsorption plate 83 are guaranteed to adsorb to each other at a designed adsorption force.

The orientations of the magnet 81 and the adsorption plate 83 are adjusted in the following procedure. First, the magnet holder 82 is attached to the base plate 42 in a state where the screws 84L and 84R are loosely tightened. In this state, the magnet holder 82 is rotatable forward and rearward around the first axial line L1 as represented by the arrows in FIG. 8. The adsorption plate 83 is attached to the linear guide 62 in a state where the screws 86U and 86D are loosely tightened. In this state, the adsorption plate is 83 rotatable clockwise and counterclockwise, as seen in a front view, around the second axial line L2 as represented by the arrows in FIG. 9.

When the magnet 81 and the adsorption plate 83 adsorb to each other in the above-described state, the magnet 81 and the magnet holder 82 rotate so as to have the orientation thereof matched to the orientation (inclination in the front-rear direction) of the adsorption plate 83 as seen in a plan view. At the same time, the adsorption plate 83 rotates so as to have the orientation thereof matched to the orientation (inclination in the up-down direction) of the magnet 81 as seen in a front view. As a result, the magnet 81 and the adsorption plate 83 face each other at a high precision, and the orientation of the magnet 81 and the orientation of the adsorption plate 83 match each other. That is, the orientation of the magnet 81 and the orientation of the adsorption plate 83 become parallel to each other. When the screws 84L, 84R, 86U and 86D are strongly tightened in this state, the magnet 81 and the adsorption plate 83 are secured in a state where the entirety of the adsorbing surface of the magnet 81 is contactable with the adsorption plate 83.

Hereinafter, functions and advantageous effects of the printer 10 according to this example embodiment will be described.

In the printer 10 according to this example embodiment, the coupling mechanism 80 includes the magnet 81, the magnet holder 82 provided on the print carriage 40 and supporting the magnet 81, and the adsorption plate 83 provided on the cut carriage 60 and adsorbable to the magnet 81. The magnet holder 82 includes the support wall 82*a* supporting the magnet 81, the bottom wall 82*b* attachable to the print carriage 40, the first and second reinforcing walls 82*c* and 82*d* (reinforcing portion) each connected with the support wall 82*a* and the bottom wall 82*b*. The magnet holder 82 is rotatable around the first axial line L1 extending in the up-down direction Z, with respect to the print carriage 40.

According to the printer 10 having such a configuration, the magnet holder 82 supporting the magnet 81 is rotatable around the first axial line L1 extending in the up-down direction Z, and therefore, the orientation of the magnet 81 is matched to the orientation of the adsorption plate 83. The magnet holder 82 includes the reinforcing portion (reinforcing walls 82*c* and 82*d*) connecting the support wall 82*a* supporting the magnet 81 and the bottom wall 82*b* to each other to improve the rigidity of the support wall 81*a*. Therefore, the support wall 81*a* is not easily curved, and the orientation of the magnet 81 is maintained even at the time of coupling the print carriage 40 and the cut carriage 60 to each other or at the time of separating the print carriage 40 and the cut carriage 60 from each other. This stabilizes the coupling of the print carriage 40 and the cut carriage 60 by the coupling mechanism 80.

In this example embodiment, the adsorption plate 83 is rotatable around the second axial line L2 extending in the sub scanning direction X, with respect to the cut carriage 60. With such a configuration, the magnet holder 82 supporting the magnet 81 is rotated around the first axial line L1 to change the orientation of the magnet 81 around the first axial line L1, and the adsorption plate 83 is rotated around the second axial line L2 to change the orientation of the adsorption plate 83 around the second axial line L2. These functions allow the orientation of the magnet 81 around the first axial line L1 to match the orientation of the adsorption plate 83, and also allow the orientation of the adsorption plate 83 around the second axial line L2 to match the orientation of the magnet 81. As a result, the orientation of the magnet 81 and the orientation of the adsorption plate 83 match each other both in the up-down direction Z and the sub scanning direction X. Therefore, the coupling force of the coupling mechanism 80 is increased.

In this example embodiment, the coupling mechanism 80 includes the screws 84L and 84R as the first securing structure to secure the magnet holder 82 to the print carriage 40, and also includes the screws 86U and 86D as the second securing structure to secure the adsorption plate 83 to the cut carriage 60. The magnet holder 82 becomes rotatable around the first axial line L1 when being loosened from the state of being secured by the screws 84L and 84R. The adsorption plate 83 becomes rotatable around the second axial line L2 when being loosened from the state of being secured by the screws 86U and 86D. With such a configuration, the screws 84L, 84R, 86U and 86D are loosened from the state of being tightened to match the orientation of the magnet 81 and the orientation of the adsorption plate 83 to each other, and then the screws 84L, 84R, 86U and 86D are tightened to secure the orientations of the magnet 81 and the adsorption plate 83. In this manner, the coupling force of the coupling mechanism 80 is more stabilized.

In this example embodiment, the bottom wall 82*b* of the magnet holder 82 includes the left through-hole 82*e*L and the right through-hole 82*e*R running through the bottom wall 82*b* in the up-down direction Z. The print carriage 40 includes the left screw hole 42*f*L and the right screw hole 42*f*R respectively formed so as to face the left through-hole 82*e*L and the right through-hole 82*e*R, the left screw hole 42*f*L and the right screw hole 42*f*R extending in the up-down direction Z. The left screw 84L is inserted into the left through-hole 82*e*L and screwed with the left screw hole 42*f*L. The right screw 84R is inserted into the right through-hole 82*e*R and screwed with the right screw hole 42*f*R. The diameter of the left through-hole 82*e*L corresponds to the diameter of the left screw 84L. A dimension of the right through-hole 82*e*R is longer than the diameter of the right screw 84R such that the magnet holder 82 is rotatable around the left through-hole 82*e*L as the center of rotation. The printer 10 having such a configuration realizes a configuration in which the magnet holder 82 is rotatable around the first axial line L1 extending in the up-down direction Z by a simple arrangement in which the dimension of the right through-hole 82*e*R is longer than the diameter of the right screw 84R.

In this example embodiment, the print carriage 40 includes the case 41 accommodating the print head 30, and the base plate 42 extending in the main scanning direction Y and the up-down direction Z and supporting the case 41. The base plate 42 includes the mount portion 42*a* formed by cutting and bending a portion of the wall 42*b* extending in the main scanning direction Y and the up-down direction Z, the mount portion 42*a* being directed upward. The left screw hole 42*f*L and the right screw hole 42*f*R are provided in the mount portion 42*a*. With such a configuration, the mount portion 42*a* including the left screw hole 42*f*L and the right screw hole 42*f*R is provided by cutting and bending a portion of the base plate 42 supporting the print head 30 and the case 41, with no increase in the number of components.

In this example embodiment, the reinforcing portion of the magnet holder 82 includes the pair of reinforcing walls 82*c* and 82*d* facing each other across the bottom wall 82*b* and each connected with the support wall 82*a* and the bottom wall 82*b*. With such a configuration, the pair of reinforcing walls 82*c* and 82*d* provide the magnet holder 82 with a shape of a box, and thus further improve the rigidity of the support wall 82*a*.

Example Embodiment 2

In example embodiment 2, the magnet 81 is rotatable around an axial line extending in the up-down direction Z and an axial line extending in the sub scanning direction X. In the following description on example embodiment 2, components having common functions to those in example embodiment 1 will bear the common reference signs to those in example embodiment 1, and overlapping descriptions will be omitted or simplified.

Figure 10:
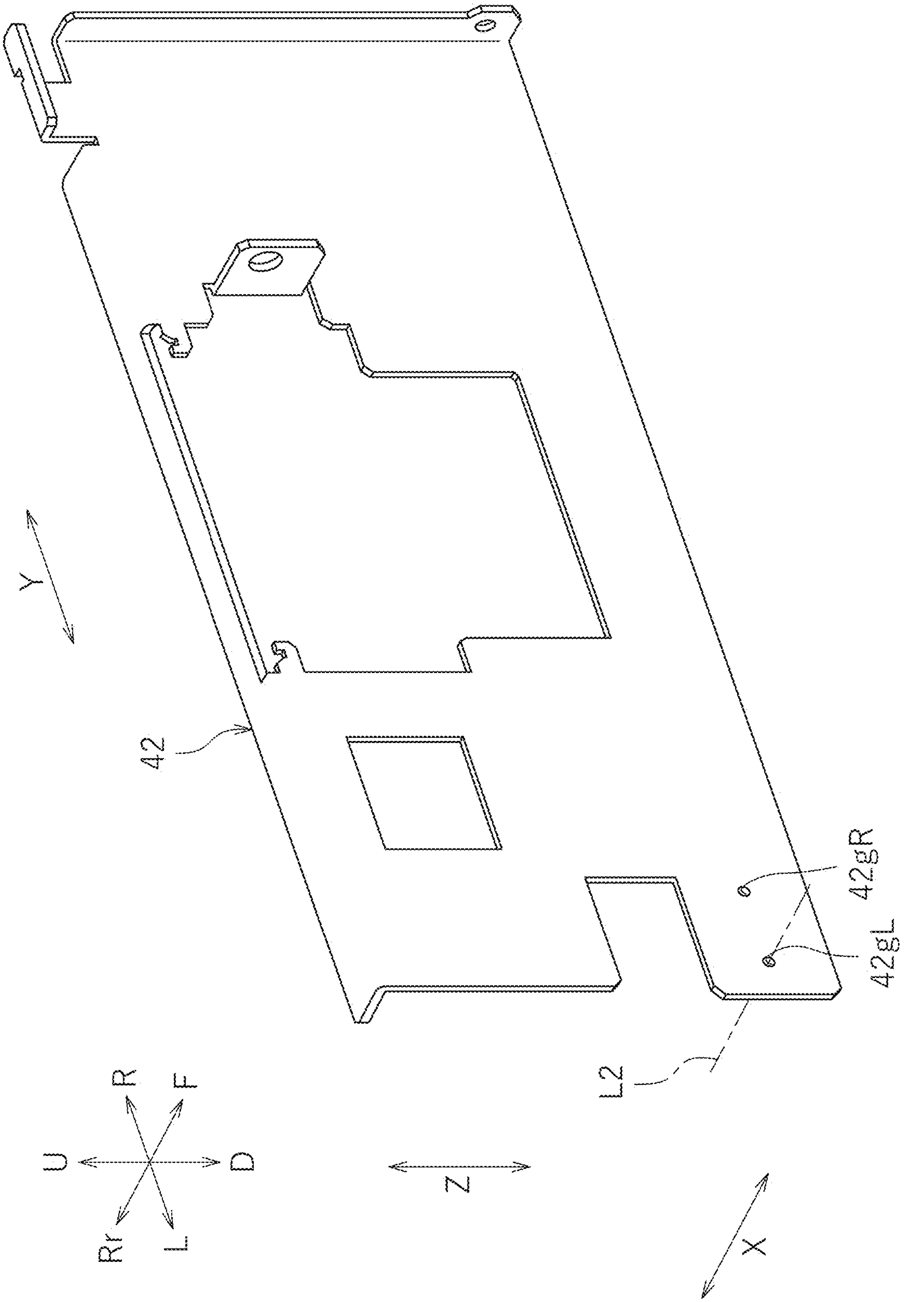
FIG. 10 is a perspective view of a base plate of a print carriage according to example embodiment 2 of the present invention.

FIG. 10 is a perspective view of a base plate 42 of a print carriage 40 according to example embodiment 2. As shown in FIG. 10, in this example embodiment, the base plate 42 does not include the mount portion 42*a* (see FIG. 5). Although not shown, the adsorption plate 83 is secured to the linear guide 62 so as not to be rotatable.

Figure 11:
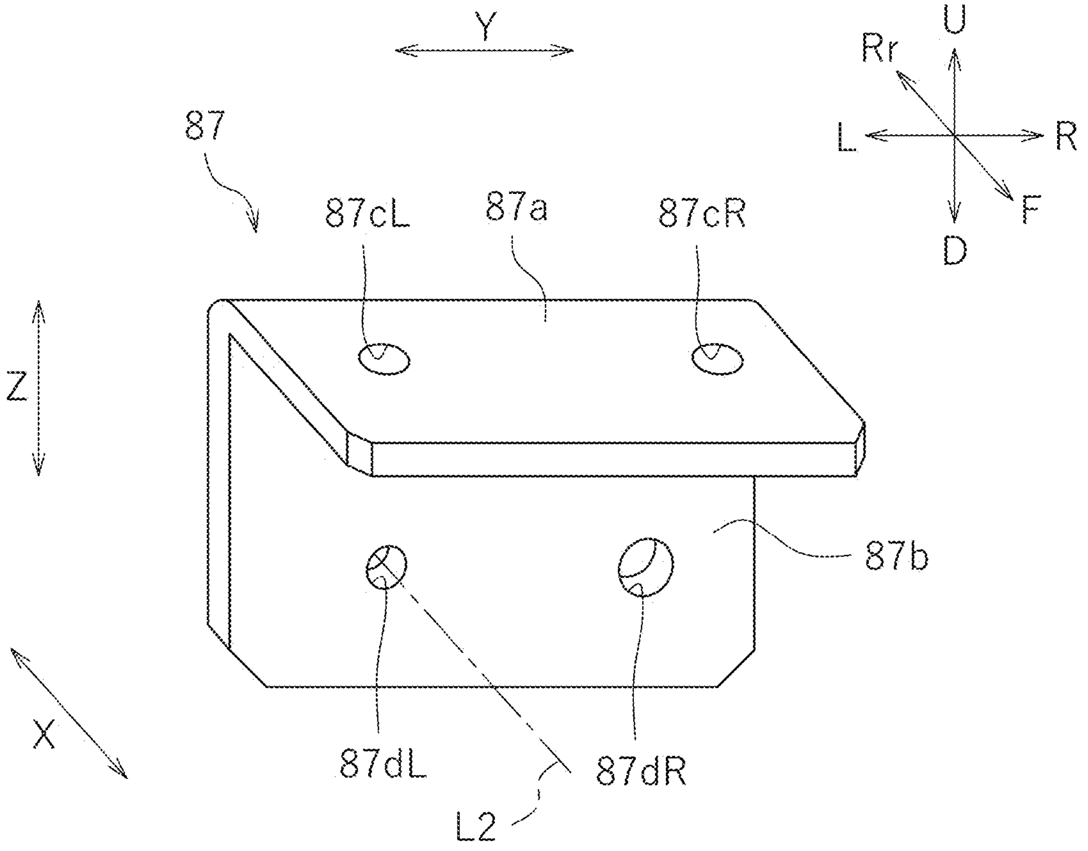
FIG. 11 is a perspective view of a mount member.

FIG. 11 is a perspective view of a mount member 87 corresponding to the mount portion 42*a* in example embodiment 1. As shown in FIG. 11, the mount member 87 is L-shaped as seen in the main scanning direction Y. The mount member 87 is formed by bending a flat plate into an L shape. A top wall of the mount member 87 defines an attachment wall 87*a*, to which the magnet holder 82 is attachable. The attachment wall 87*a* extends in the main scanning direction Y and the sub scanning direction X. A wall 87*b*, crossing the attachment wall 87*a* of the mount member 87 substantially perpendicularly, extends in the main scanning direction Y and the up-down direction Z. The wall 87*b* of the mount member 87 is a movable wall 87*b* rotatable around an axial line extending in the sub scanning direction X (this axial line is referred to as the "second axial line L2" also in this example embodiment) with respect to the base plate 42.

As shown in FIG. 11, the attachment wall 87*a* of the mount member 87 includes screw holes 87*c*L and 87*c*R formed therein. The screws 84L and 84R (see FIG. 8) securing the magnet holder 82 are screwed with the screw holes 87*c*L and 87*c*R. The screw holes 87*c*L and 87*c*R are aligned in the main scanning direction Y. The screw holes 87*c*L and 87*c*R are respectively located so as to face the left through-hole 82*e*L and the right through-hole 82*e*R (see FIG. 7) of the magnet holder 82. The screw holes 87*c*L and 87*c*R extend in the up-down direction Z. The left screw hole 87*c*L is an example of the third screw hole, and the right screw hole 87*c*R is an example of the fourth screw hole.

The mount member 87 includes a left through-hole 87*d*L and a right through-hole 87*d*R formed therein. The left through-hole 87*d*L and the right through-hole 87*d*R extend through the mount member 87 in the sub scanning direction X. The left through-hole 87*d*L and the right through-hole 87*d*R are located in the movable wall 87*b*. The left through-hole 87*d*L is an example of the fifth through-hole, and the right through-hole 87*d*R is an example of the sixth through-hole. As shown in FIG. 10, the base plate 42 of the print carriage 40 includes a left screw hole 42*g*L and a right screw hole 42*g*R formed therein. The left screw hole 42*g*L and the right screw hole 42*g*R are respectively located so as to face the left through-hole 87*d*L and the right through-hole 87*d*R. The left screw hole 42*g*L and the right screw hole 42*g*R extend in the sub scanning direction X. The left screw hole 42*g*L is an example of the fifth screw hole, and the right screw hole 42*g*R is an example of the sixth screw hole.

Figure 12:
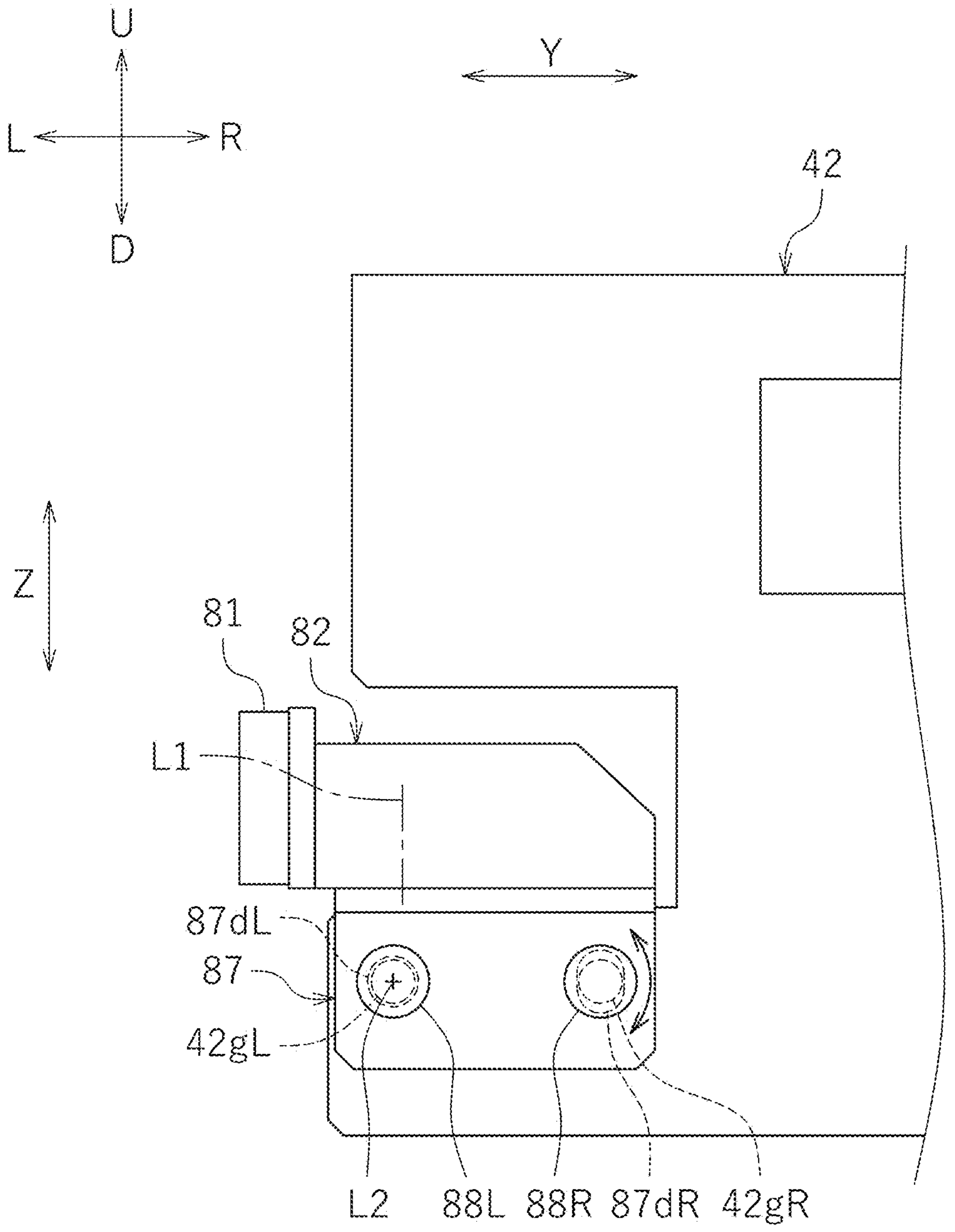
FIG. 12 is a front view of the base plate in a state where the magnet holder and the mount member are attached thereto.

FIG. 12 a front view of the base plate 42 in a state where the magnet holder 82 and the mount member 87 are attached thereto. As shown in FIG. 12, a left screw 88L is inserted into the left through-hole 87*d*L of the mount member 87 and screwed with the left screw hole 42*g*L of the base plate 42. A right screw 88R is inserted into the right through-hole 87*d*R of the mount member 87 and screwed with the right screw hole 42*g*R of the base plate 42. The left screw 88L and the right screw 88R provide an example of the fourth securing structure. The mount member 87 is provided on the print carriage 40 and supports the magnet holder 82. The mount member 87 locates the magnet 81 supported by the magnet holder 82 on a side surface of the print carriage 40 in the main scanning direction (on the left side surface in this example embodiment).

The left through-hole 87*d*L of the mount member 87 has a diameter corresponding to a diameter of the left screw 88L. The right through-hole 87*d*R has a dimension longer than a diameter of the right screw 88R such that the mount member 87 is rotatable around the left through-hole 87*d*L as the center of rotation. With such a configuration, the mount member 87 becomes rotatable around the second axial line L2 extending in the sub scanning direction X when being loosened from the state of being secured by the screws 88L and 88R.

The magnet holder 82 has substantially the same configuration as that in example embodiment 1. The left screw 84L and the right screw 84R provide an example of the third securing structure to secure the magnet holder 82 to the mount member 87. The magnet holder 82 becomes rotatable around the first axial line L1 extending in the up-down direction Z, with respect to the mount member 87, when being loosened from the state of being secured by the screws 84L and 84R. The mount member 87 is provided between the print carriage 40 and the magnet holder 82, and supports the magnet holder 82 such that the magnet holder 82 is rotatable around the first axial line L1. The mount member 87 is rotatable around the second axial line L2 with respect to the print carriage 40.

The printer 10 according to this preferred example embodiment provides substantially the same functions and advantageous effects as those provided by the printer 10 according to example embodiment 1. In this preferred example embodiment, the orientations of the magnet 81 around the first axial line L1 and around the second axial line L2 are matched to those of the adsorption plate 83. As a result, the orientation of the magnet 81 and the orientation of the adsorption plate 83 match each other around the up-down direction Z and around the sub scanning direction X. This increases the coupling force of the coupling mechanism 80.

The configuration in which the mount member 87 rotates around the second axial line L2 extending in the sub scanning direction X is easily realized by a configuration substantially the same as the configuration in which the magnet holder 82 rotates with respect to the mount member 87 (the arrangement in which the dimension of the right through-hole 87*d*R is longer than the diameter of the right screw 88R).

Other Example Embodiments

Some example embodiments are described above. The above-described example embodiments are merely examples, and the technologies disclosed herein may be carried out in various other forms.

For example, in the above-described example embodiments, the magnet 81 is provided on the print carriage 40, whereas the adsorption plate 83 is provided on the cut carriage 60. Alternatively, the magnet 81 may be provided on the cut carriage 60, whereas the adsorption plate 83 may be provided on the print carriage 40.

In the above-described example embodiments, the magnet holder 82 includes the first reinforcing wall 83*c* and the second reinforcing wall 83*d*. Alternatively, the magnet holder 82 may have only one reinforcing wall. The reinforcing portion does not need to be connected with the edge of the support wall 82*a* supporting the magnet 81. For example, the reinforcing portion may be provided at a center of the support wall 82*a* in the sub scanning direction X. There is no specific limitation on the number, the location, the shape or the like of the components included in the reinforcing portion.

In example embodiment 1 described above, the orientation of the magnet 81 around the first axial line L1 (orientation around the axial line extending in the up-down direction Z) and the orientation of the adsorption plate 83 around the second axial line L2 (orientation around the axial line extending in the sub scanning direction X) are adjusted. Alternatively, the orientation of the magnet 81 around the axial line extending in the sub scanning direction X and the orientation of the adsorption plate 83 around the axial line extending in the up-down direction Z may be adjusted.

In example embodiment 2 described above, the orientation of the magnet 81 around the first axial line L1 and the orientation of the magnet 81 around the second axial line L2 are adjusted. Alternatively, the orientation of the adsorption plate 83 around the axial line extending in the up-down direction Z and the orientation of the adsorption plate 83 around the axial line extending in the sub scanning direction X may be adjusted.

In the description of the above-described example embodiments, the coupling mechanism 80 coupling the print carriage 40 holding the print head 30 and the cut carriage 60 holding the cutting head 50 is described. The coupling mechanism 80 is not limited to coupling the print carriage 40 and the cut carriage 60, and may couple any two carriages.

Unless otherwise specified, the example embodiments described herein do not limit the present invention.

The terms and expressions used herein are for description only and are not to be interpreted in a limited sense. These terms and expressions should be recognized as not excluding any equivalents to the elements shown and described herein and as allowing any modification encompassed in the scope of the claims. The present invention may be embodied in many various forms. This disclosure should be regarded as providing example embodiments of the principle of the present invention. These example embodiments are provided with the understanding that they are not intended to limit the present invention to the example embodiments described in the specification and/or shown in the drawings. The present invention is not limited to the example embodiments described herein. The present invention encompasses any of example embodiments including equivalent elements, modifications, deletions, combinations, improvements and/or alterations which can be recognized by a person of ordinary skill in the art based on the disclosure. The elements of each claim should be interpreted broadly based on the terms used in the claims, and should not be limited to any of the example embodiments described in this specification or referred to during the prosecution of the present application.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A printer comprising:

a print head to eject ink;

a print carriage to hold the print head;

a cutting head including a cutter to cut a recording medium;

a cut carriage to hold the cutting head;

a guide rail extending in a main scanning direction, the print carriage and the cut carriage being engaged with the guide rail so as to be slidable in the main scanning direction;

a mover to move the print carriage or the cut carriage along the guide rail; and a coupling mechanism provided on the print carriage and the cut carriage to couple the print carriage and the cut carriage to each other; wherein the coupling mechanism includes:
a magnet;
a first support provided on one of the print carriage and the cut carriage, the first support supporting the magnet; and
an adsorption body provided on the other of the print carriage and the cut carriage, the adsorption body being adsorbable to the magnet; and
the first support includes a support portion supporting the magnet, an attachment portion attachable to the one of the print carriage and the cut carriage, and a reinforcing portion connected with the support portion and the attachment portion, and the first support is rotatable with respect to the one of the print carriage and the cut carriage, the first support being rotatable around a first axial line extending in a first perpendicular direction crossing the main scanning direction perpendicularly.

2. The printer according to claim 1, wherein the adsorption body is rotatable with respect to the other of the print carriage and the cut carriage, the adsorption body being rotatable around a second axial direction extending in a second perpendicular direction crossing the main scanning direction and the first perpendicular direction perpendicularly.

3. The printer according to claim 2, wherein
the coupling mechanism includes:
a first securing structure to secure the first support to the one of the print carriage and the cut carriage; and
a second securing structure to secure the adsorption body to the other of the print carriage and the cut carriage;
the first support becomes rotatable around the first axial line when being loosened from a state of being secured by the first securing structure; and
the adsorption body becomes rotatable around the second axial line when being loosened from a state of being secured by the second securing structure.

4. The printer according to claim 3, wherein
the attachment portion includes a first through-hole and a second through-hole extending through the attachment portion in the first perpendicular direction;
the one of the print carriage and the cut carriage includes a first screw hole and a second screw hole extending in the first perpendicular direction and respectively facing the first through-hole and the second through-hole;
the first securing structure includes:
a first screw inserted into the first through-hole and screwed with the first screw hole; and
a second screw inserted into the second through-hole and screwed with the second screw hole;
the first through-hole has a diameter corresponding to a diameter of the first screw; and
the second through-hole has a dimension longer than a diameter of the second screw such that the first support is rotatable around the first through-hole as a center of rotation.

5. The printer according to claim 4, wherein
the one of the print carriage and the cut carriage includes:
a case accommodating the print head or the cutting head; and
an attachment plate extending in the main scanning direction and the first perpendicular direction, the attachment plate supporting the case;
the attachment plate includes:
a first cut line extending in the main scanning direction and being cut up to an end thereof,
a second cut line crossing to the first cut line and extending in the first perpendicular direction,
an attachment wall formed by a bent portion bent along a line extending in the main scanning direction from an end of the second cut line; and
the first screw hole and the second screw hole are located in the attachment wall.

6. The printer according to claim 1, wherein, where a direction perpendicular to the main scanning direction and the first perpendicular direction is a second perpendicular direction:
the coupling mechanism includes a second support provided between the first support and the one of the print carriage and the cut carriage, the second support supporting the first support such that the first support is rotatable around the first axial line, the second support being rotatable around a second axial line extending in the second perpendicular direction, with respect to the one of the print carriage and the cut carriage.

7. The printer according to claim 6, wherein
the coupling mechanism includes:
a third securing structure to secure the first support to the second support; and
a fourth securing structure to secure the second support to the one of the print carriage and the cut carriage;
the first support becomes rotatable around the first axial line when being loosened from a state of being secured by the third securing structure; and
the second support becomes rotatable around the second axial line when being loosened from a state of being secured by the fourth securing structure.

8. The printer according to claim 7, wherein
the attachment portion includes a third through-hole and a fourth through-hole extending through the attachment portion in the first perpendicular direction;
the second support includes a third screw hole and a fourth screw hole extending in the first perpendicular direction and respectively facing the third through-hole and the fourth through-hole;
the third securing structure includes:
a third screw inserted into the third through-hole and screwed with the third screw hole; and
a fourth screw inserted into the fourth through-hole and screwed with the fourth screw hole;
the third through-hole has a diameter corresponding to a diameter of the third screw; and
the fourth through-hole has a dimension longer than a diameter of the fourth screw such that the first support is rotatable around the third through-hole as a center of rotation.

9. The printer according to claim 8, wherein
the second support includes a fifth through-hole and a sixth through-hole extending through the second support in the second perpendicular direction;
the one of the print carriage and the cut carriage includes a fifth screw hole and a sixth screw hole extending in the second perpendicular direction and respectively facing the fifth through-hole and sixth through-hole;
the fourth securing structure includes:
a fifth screw inserted into the fifth through-hole and screwed with the fifth screw hole; and
a sixth screw inserted into the sixth through-hole and screwed with the sixth screw hole;
the fifth through-hole has a diameter corresponding to a diameter of the fifth screw; and the sixth through-hole has a dimension longer than a diameter of the sixth screw such that the second support is rotatable around the fifth through-hole as a center of rotation.

10. The printer according to claim 1, wherein the reinforcing portion includes a pair of reinforcing structures facing each other across the attachment portion and each being connected with the support portion and the attachment portion.

* * * * *